US007867648B2

(12) United States Patent
Atanasoski et al.

(10) Patent No.: US 7,867,648 B2
(45) Date of Patent: Jan. 11, 2011

(54) FUEL CELL CATALYST (75) Inventors: Radoslav Atanasoski, Edina, MN (US); Alison K. Schmoeckel, Stillwater, MN (US); David G. O'Neill, Lake Elmo, MN (US); George D. Vernstrom, Cottage Grove, MN (US); Dennis P. O'Brien, Maplewood, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1148 days.

(21) Appl. No.: 11/276,166

(22) Filed: Feb. 16, 2006

(65) Prior Publication Data

US 2009/0226796 A1    Sep. 10, 2009

Related U.S. Application Data (60) Provisional application No. 60/653,359, filed on Feb. 16, 2005.

(51) Int. Cl.
    *H01M 4/60*    (2006.01)
(52) U.S. Cl. ........................... 429/137; 429/212
(58) Field of Classification Search ............ 429/40; 502/100
    See application file for complete search history.

(56) References Cited

U.S. PATENT DOCUMENTS

| 4,333,916 | A | 6/1982 | Iwai et al. |
|---|---|---|---|
| 4,578,135 | A | 3/1986 | Ueno et al. |
| 5,240,893 | A | 8/1993 | Witherspoon |
| 5,643,343 | A | 7/1997 | Selifanov et al. |
| 5,645,951 | A | 7/1997 | Johnssen |
| 5,711,773 | A | 1/1998 | Selifanov et al. |
| 6,150,569 | A | 11/2000 | Hamann et al. |
| 6,403,245 | B1 | 6/2002 | Hunt |
| 6,425,993 | B1 * | 7/2002 | Debe et al. ............ 204/296 |
| 6,475,653 | B1 | 11/2002 | Gomez |
| 6,610,436 | B1 | 8/2003 | Dearnaley et al. |
| 6,835,489 | B2 | 12/2004 | Venkatesan et al. |
| 7,005,401 | B2 | 2/2006 | Lu et al. |
| 2002/0144394 | A1 | 10/2002 | Uchida et al. |
| 2003/0004058 | A1 | 1/2003 | Li et al. |
| 2003/0124717 | A1 | 7/2003 | Awano et al. |
| 2004/0058808 | A1 | 3/2004 | Lu et al. |
| 2004/0081880 | A1 * | 4/2004 | Chang ............ 429/44 |
| 2004/0121210 | A1 | 6/2004 | Hamrock et al. |
| 2004/0121221 | A1 * | 6/2004 | Suzuki et al. ............ 429/44 |
| 2004/0197638 | A1 | 10/2004 | McElrath et al. |
| 2004/0197641 | A1 | 10/2004 | Visco et al. |
| 2005/0031921 | A1 | 2/2005 | Ovshinsky et al. |
| 2005/0095189 | A1 | 5/2005 | Brey et al. |
| 2005/0095355 | A1 | 5/2005 | Leistra et al. |
| 2005/0176990 | A1 * | 8/2005 | Coleman et al. ........ 562/11 |
| 2005/0200040 | A1 | 9/2005 | Hara et al. |
| 2005/0221155 | A1 | 10/2005 | McLean et al. |
| 2005/0221156 | A1 | 10/2005 | McLean et al. |
| 2006/0088739 | A1 | 4/2006 | Ovshinsky |
| 2006/0194092 | A1 | 8/2006 | Kanai et al. |
| 2006/0264319 | A1 | 11/2006 | Yoo et al. |
| 2007/0248752 | A1 | 10/2007 | O'Brien et al. |
| 2007/0248875 | A1 | 10/2007 | O'Brien et al. |
| 2008/0113257 | A1 | 5/2008 | Hampden-Smith et al. |
| 2008/0274269 | A1 | 11/2008 | Bose et al. |

FOREIGN PATENT DOCUMENTS

| DE | 100 38 800 A1 | 6/2002 |
|---|---|---|
| JP | 2004/217977 | 8/2004 |

OTHER PUBLICATIONS

Chemistry World; "Less Platinum For Cheaper Fuel Cells", Aug. 2, 2005.
Halford, Bethany; Chemical & Engineering News, "Nanotube Catalysts" Nitrogen-Doped Carbon Nanotubes Could Make Fuel Cells More Affordable, vol. 87, No. 6, Feb. 9, 2009, pp. 7.
Hitachi Australia, "New Catalyst for Oxygen-Reducing Reactions From Hitachi Maxell", Apr. 4, 2008. (no page numbers).
"Platinum-Nickel Allow Found to be Most Active Oxygen-Reducing Catalyst Ever Reported", Jan. 30, 2007, no citation, no page numbers.
N. J. Kim, "Structure and Properties of Rapidly Solidified Al-Li-Cu-Mg-Zr Alloys with a High Zirconium Content", *Materials Science and Engineering*, A158, 1992, (pp. 103-110).
Dahn, et al., "Economical Sputtering System to Produce Large-Size Composition-Spread Libraries Having Linear and Orthogonal Stoichiometry Variations", *Chemistry of Materials*, 14 (8), 2002, (pp. 3519-3523).
Easton, et al., "Preparation and Characterization of Sputtered $Fe_{1-x}N_x$ Films", *Thin Solid Films*, 493, 2005, (pp. 60-66).
Villers, et al., "Fe-Based Catalysts for Oxygen Reduction in PEM Fuel Cells: Pretreatment of the Carbon Support", *J. Electrochem. Soc.* 151, (9), 2004, (pp. A1507-A1515).

(Continued)

*Primary Examiner*—Dah-Wei D Yuan
*Assistant Examiner*—Jacob Marks
(74) *Attorney, Agent, or Firm*—Philip Y. Dahl (57) ABSTRACT A method is provided for making a supported catalyst comprising nanostructured elements which comprise microstructured support whiskers bearing nanoscopic catalyst particles, where the method comprises step a) of vacuum deposition of material from at least a first carbon target in the presence of nitrogen and step b) of vacuum deposition of material from a second target comprising at least one transition metal, the second target comprising no precious metals. In one embodiment, step a) is carried out prior to step b). In another embodiment, steps a) and b) are carried out simultaneously. Typically the deposition steps are carried out in the absence of oxygen. Typically, the transition metal is iron or cobalt, and most typically iron. The present disclosure also provides a supported catalyst comprising nanostructured elements which comprise microstructured support whiskers bearing nanoscopic catalyst particles made according to the present method. The present disclosure also provides a fuel cell membrane electrode assembly comprising the present supported catalyst.

6 Claims, 2 Drawing Sheets

OTHER PUBLICATIONS

Lefevre, et al., "Fe-Based Catalysts for the Reduction of Oxygen in Polymer Electrolyte Membrane Fuel Cell Conditions: Determination of the Amount of Peroxide Released During Electroreduction and its Influence on the Stability of the Catalysts", *Electrochimica Acta*, 48, 2003, (pp. 2749-2760).

Paik, et al., "Extent of PEMFC Cathode Surface Oxidation by Oxygen and Water Measured by CV", *Electrochemical and Solid-State Letters*, 7, (4), 2004, (pp. A82-A84).

Atanasoski, "2004 DOE Hydrogen, Fuel Cells, and Infrastructure Technologies Program Review Meeting", May 24-27, 2004, Philadelphia, PA, Presentation FC17, (pp. 1-16).

Faubert, et al., "Oxygen Reduction Catalysts For Polymer Electrolyte Fuel Cells From The Pyrolysis Of $Fe^{II}$ Acetate Adsorbed On 3,4,9,10-Perylenetetracarboxylic Dianhydride", *Electrochimica Acta*, 44, 1999, (pp. 2589-2603).

\* cited by examiner

FUEL CELL CATALYST

CROSS-REFERENCE TO RELATED APPLICATION

This application claims the benefit of U.S. Provisional Patent Application No. 60/653,359, filed Feb. 16, 2005.

This invention was made with Government support under Cooperative Agreement DE-FC36-02AL67621 awarded by DOE. The Government has certain rights in this invention.

FIELD

This invention relates to non-precious metal catalysts which may be useful in fuel cells.

BACKGROUND

M. K. Debe, "Novel catalysts, catalyst support and catalyst coated membrane methods," in *Handbook of Fuel Cells, Fundamentals Technology and Applications*, Vol. 3, eds. W. Vielstich, A. Lamm and H. Gasteiger, John Wiley and Sons, p. 576 et seq., describes nanostructured thin film catalysts which may be useful as fuel cell catalysts.

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. App. Pub. No. 2002/0004453 A1, the disclosure of which is incorporated herein by reference, discloses fuel cell electrode catalysts comprising alternating platinum-containing layers and layers containing suboxides of a second metal that display an early onset of CO oxidation.

U.S. Pats. Nos. 5,338,430, 5,879,828, 6,040,077 and 6,319,293, the disclosures of which are incorporated herein by reference, also concern nanostructured thin film catalysts.

U.S. Pats. Nos. 4,812,352, 5,039,561, 5,176,786, and 5,336,558, the disclosures of which are incorporated herein by reference, concern microstructures.

U.S. patent application Ser. No. 10/674,594, the disclosure of which is incorporated herein by reference, discloses fuel cell cathode catalysts comprising nanostructures formed by depositing alternating layers of platinum and a second layer onto a microstructure support, which may form a ternary catalyst.

U.S. Pat. No. 5,079,107 discloses a catalyst for a phosphoric acid electrolyte fuel cell comprising a ternary alloy of Pt—Ni—Co, Pt—Cr—C or Pt—Cr—Ce.

U.S. Pat. No. 4,985,386 discloses a catalyst on a carbon support, the catalyst comprising carbides of Pt, carbides of a second metal selected from Ni, Co, Cr and Fe, and optionally carbides of Mn. The reference also discloses a method of making a carbon supported catalyst by reductive deposition of metal ions onto carbon supports followed by alloying and at least partial carburizing of the metals by application of heat and carbon-containing gasses.

U.S. Pat. No. 5,593,934 discloses a catalyst on a carbon support, the catalyst comprising 40-90 atomic % Pt, 30-5 atomic % Mn and 30-5 atomic % Fe. The reference includes comparative examples purportedly demonstrating carbon-supported catalysts comprising 50 atomic % Pt, 25 atomic % Ni and 25 atomic % Co; 50 atomic % Pt and 50 atomic % Mn; and Pt alone.

U.S. Pat. No. 5,872,074 discloses a catalyst made by first preparing a metastable composite or alloy which comprises crystallites having a grain size of 100 nm or lower and then leaching away one of the elements of that alloy.

Markovic et al., *Oxygen Reduction Reaction on Pt and Pt Bimetallic Surfaces: A Selective Review, Fuel Cells*, 2001, Vol. 1, No. 2 (pp. 105-116) examines reactions at crystal surfaces of bimetallic Pt—Ni and Pt—Co catalysts made by underpotential deposition method, the classical metallurgical method and deposition of pseudomorphic metal films.

Paulus et al., *Oxygen Reduction on Carbon-Supported Pt—Ni and Pt—Co Alloy Catalysts, J. Phys. Chem. B*, 2002, No. 106 (pp. 4181-4191) examines commercially available carbon-supported catalysts comprising Pt—Ni and Pt—Co alloys.

U.S. patent application Ser. No. 11/248,441, filed Oct. 12, 2005, discloses certain nanostructured thin film catalysts including three or more metallic elements which may be useful as fuel cell catalysts.

M. Lefevre, J. P. Dodelet, *J. Phys. Chem. B*, 104 (2000) 11238 and F. Jaouen, S. Marcotte, J. P. Dodelet, G. Lindbergh, *J. Phys. Chem. B*, 107 (2003) 1376 purportedly describe a Fe—$N_2$—$C_x$ active center for catalytic activity and postulate that, for high activity, all three elements must be present and high nitrogen concentration must be achieved on the surface of the carbon support, where nitrogen would preferably be in pyridinic form.

SUMMARY OF THE INVENTION

Briefly, the present disclosure provides a method of making a supported catalyst comprising nanostructured elements which comprise microstructured support whiskers bearing nanoscopic catalyst particles, where the method comprises step a) of vacuum deposition of material from at least a first carbon target in the presence of nitrogen and step b) of vacuum deposition of material from a second target comprising at least one transition metal, the second target comprising no precious metals. In one embodiment, step a) is carried out prior to step b). In another embodiment, steps a) and b) are carried out simultaneously. Typically the deposition steps are carried out in the absence of oxygen. Typically, the transition metal is iron or cobalt, and most typically iron. The present disclosure also provides a supported catalyst comprising nanostructured elements which comprise microstructured support whiskers bearing nanoscopic catalyst particles made according to the present method. The present disclosure also provides a fuel cell membrane electrode assembly comprising the present supported catalyst.

In this application:

"membrane electrode assembly" means a structure comprising a membrane that includes an electrolyte, typically a polymer electrolyte, and at least one but more typically two or more electrodes adjoining the membrane;

"nanostructured element" means an acicular, discrete, microscopic structure comprising a catalytic material on at least a portion of its surface;

"nanoscopic catalyst particle" means a particle of catalyst material having at least one dimension equal to or smaller than about 15 nm or having a crystallite size of about 15 nm or less, as measured from diffraction peak half widths of standard 2-theta x-ray diffraction scans;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer;

"non-precious metal" means a metal other than ruthenium, rhodium, palladium, osmium, iridium, platinum, gold or silver; and the symbol "Å" represents Angstroms, notwithstanding any typographical or computer error.

It is an advantage of the present invention to provide cathode catalysts for use in fuel cells.

DETAILED DESCRIPTION

The present invention provides a method of making a supported catalyst comprising nanostructured elements which comprise microstructured support whiskers bearing nanoscopic catalyst particles, where the method comprises the step of depositing a catalyst material comprising carbon, nitrogen, and at least one non-precious transition metal, typically iron or cobalt. Typically oxygen is excluded. In addition, the present invention provides a supported catalyst comprising nanostructured elements which comprise microstructured support whiskers bearing nanoscopic catalyst particles made according to the method of the present invention.

The present invention provides a method of making a catalyst which comprises nanostructured elements comprising microstructured support whiskers bearing nanoscopic catalyst particles. U.S. Pat. Nos. 4,812,352, 5,039,561, 5,176,786, and 5,336,558, the disclosures of which are incorporated herein by reference, concern microstructures which may be used in the practice of the present invention. U.S. Pat. Nos. 5,338,430, 5,879,827, 6,040,077 and 6,319,293 and U.S. Pat. App. Pub. No. 2002/0004453 A1, the disclosures of which are incorporated herein by reference, describe nanostructured elements comprising microstructured support whiskers bearing nanoscopic catalyst particles. U.S. Pat. No. 5,879,827 and U.S. Pat. App. Pub. No. 2002/0004453 A1, the disclosures of which are incorporated herein by reference, describe nanoscopic catalyst particles comprising alternating layers.

The catalyst material useful in the present invention comprises at least one non-precious transition metal, that is, a transition metal other than ruthenium, rhodium, palladium, osmium, iridium, platinum, gold or silver. Typically, the transition metal is iron or cobalt and most typically iron.

Typically, the method according to the present invention comprises vacuum deposition. Typically the vacuum deposition steps are carried out in the absence of oxygen or substantially in the absence of oxygen. Typically, sputter deposition is used. Any suitable microstructures may be used, including organic or inorganic microstructures. Typical microstructures are described in U.S. Pats. Nos. 4,812,352, 5,039,561, 5,176,786, 5,336,558, 5,338,430, 5,879,827, 6,040,077 and 6,319,293, and U.S. Pat. App. Pub. No. 2002/0004453 A1, the disclosures of which are incorporated herein by reference. Typical microstructures are made by thermal sublimation and vacuum annealing of the organic pigment C.I. Pigment Red 149, i.e., N,N'-di(3,5-xylyl)perylene-3,4:9,10-bis(dicarboximide). Methods for making organic nanostructured layers are disclosed in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. Nos. 4,568,598, 4,340,276, the disclosures of the patents are incorporated herein by reference. Properties of catalyst layers using carbon nanotube arrays are disclosed in the article "High Dispersion and Electrocatalytic Properties of Platinum on Well-Aligned Carbon Nanotube Arrays," Carbon 42 (2004) 191-197. Properties of catalyst layers using grassy or bristled silicon are disclosed in U.S. Pat. App. Pub. 2004/0048466 A1.

In one embodiment of the process of the present disclosure, the catalyst may be produced in a single step by simultaneous deposition of carbon and the transition metal in the presence of nitrogen. Alternately, a catalyst according to the present disclosure may be produced in a two-step process by sequential deposition of carbon in the presence of nitrogen to produce highly nitrogenated carbon followed by deposition of the transition metal. Typically the second step of the two-step process is carried out before any contact with oxygen. In either case, a nitrogen-containing carbon is formed which is distinguishable from carbon-only catalyst support materials.

Vacuum deposition may be carried out in any suitable apparatus, such as described in U.S. Pats. Nos. 5,338,430, 5,879,827, 5,879,828, 6,040,077 and 6,319,293 and U.S. Pat. App. Pub. No. 2002/0004453 A1, the disclosures of which are incorporated herein by reference. One such apparatus is depicted schematically in FIG. 4A of U.S. Pat. No. 5,338,430, and discussed in the accompanying text, wherein the substrate is mounted on a drum which is then rotated under a DC magnetron sputtering source.

It will be understood by one skilled in the art that the crystalline and/or morphological structure of a catalyst such as that according to the present invention, including the presence, absence, or size of alloys, amorphous zones, crystalline zones of one or a variety of structural types, and the like, may be highly dependent upon process and manufacturing conditions, particularly when three or more elements are combined.

Further, the present invention provides fuel cell membrane electrode assembly comprising the supported catalyst according to the present invention. The catalysts of the present invention can be used to manufacture catalyst coated membranes (CCM's) or membrane electrode assemblies (MEA's) incorporated in fuel cells such as are described in U.S. Pat. Nos. 5,879,827 and 5,879,828, the teachings of which are incorporated herein by reference. The supported catalyst according to the present invention may be used as an anode catalyst. The supported catalyst according to the present invention may be used as a cathode catalyst.

The membrane electrode assembly (MEA) according to the present invention may be used in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes H$^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

A PEM used in a CCM or MEA according to the present invention may comprise any suitable polymer electrolyte. The polymer electrolytes useful in the present invention typically bear anionic functional groups bound to a common backbone, which are typically sulfonic acid groups but may also include carboxylic acid groups, imide groups, amide groups, or other acidic functional groups. The polymer electrolytes useful in the present invention are typically highly fluorinated and most typically perfluorinated. The polymer electrolytes useful in the present invention are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2$—$CF_2CF_2CF_2CF_2$—O—CF=$CF_2$, described in U.S. patent application Ser. Nos. 10/322,254, 10/322,226 and 10/325,278, which are incorporated herein by reference. The polymer typically has an equivalent weight (EW) of 1200 or less, more typically 1100 or less, more typically 1000 or less, and may have an equivalent weight of 900 or less, or 800 or less.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and in some embodiments about 25 microns.

In one embodiment of the present invention, one or more manganese oxides, such as $MnO_2$ or $Mn_2O_3$, is added to the polymer electrolyte prior to membrane formation. Typically the oxide is mixed well with the polymer electrolyte to achieve substantially uniform distribution. Mixing is achieved by any suitable method, including milling, kneading and the like, and may occur with or without the inclusion of a solvent. The amount of oxide added is typically between 0.01 and 5 weight percent based on the total weight of the final polymer electrolyte or PEM, more typically between 0.1 and 2 wt %, and more typically between 0.2 and 0.3 wt %. Factors mitigating against inclusion of excessive manganese oxide include reduction of proton conductivity, which may become a significant factor at greater than 0.25 wt % oxide.

In one embodiment of the present invention, a salt of manganese is added to the acid form polymer electrolyte prior to membrane formation. Typically the salt is mixed well with or dissolved within the polymer electrolyte to achieve substantially uniform distribution. The salt may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, including $Mn^{2+}$, $Mn^{3+}$ and $Mn^{4+}$, but are most typically $Mn^{2+}$. Without wishing to be bound by theory, it is believed that the manganese cations persist in the polymer electrolyte because they are exchanged with H$^+$ ions from the anion groups of the polymer electrolyte and become associated with those anion groups. Furthermore, it is believed that polyvalent manganese cations may form crosslinks between anion groups of the polymer electrolyte, further adding to the stability of the polymer. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05.

In making an MEA, GDL's may be applied to either side of a CCM. The GDL's may be applied by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present invention is typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

DC Magnetron Sputter System Process

The method used to make the catalysts was essentially similar to the system described in U.S. Pat. No. 6,040,077 "Catalyst for Membrane Electrode Assembly and Method of Making". The chamber included a rotating drum DC and RF magnetron sputtering system. The deposition system consisted of a multiple source reactive DC Magnetron sputtering system in which the substrate may be rotated under each sputtering source sequentially, resulting in a layered structure being fabricated, or may be placed under one source for a steady deposition of material. The system was equipped with a 305 cm (12 inch) diameter drum. The system was pumped using a single stage roughing pump with heated filter followed by a CTI-8 cryopump (CTI company) to obtain a base pressure of below $9.2 \times 10^{-3}$ atm ($7 \times 10^{-6}$ Torr). Such low pressures were found to aid in producing catalytic materials of low oxide content and high purity. Two MKS flow meters were used to control the gas flow of 99.99 percent purity Ar and $N_2$.

Small magnetrons capable of producing a uniform deposition region over a 12.7 cm (5 inch) wide web were purchased from Sierra Applied Sciences. Using their data, a 7.6 cm (3 inch) diameter sputter target was chosen. The magnetrons were operated in argon at $3 \times 10^{-6}$ atm (2.5 mTorr). 10 SCCM of Ar was found to provide stable operating conditions using DC power from MDX-10K AE power supplies.

The magnetrons were equipped with 4 in. long stainless steel side shields so that the source materials would not intermix during catalyst deposition. The shields were frequently cleaned to lower the possibility of target contamination caused by flecks of material falling on the target during operation.

Processing conditions are listed in Table 2 for examples 2 and 3.

Carbon Pulsed Cathodic Arc Process

Reactive plasma deposition of $C-N_x-Fe_y$ was done by using pulsed cathodic arc plasma generating equipment together with a source of nitrogen gas. The pulsed cathodic arc system is described in U.S. Pat. No. 5,643,343 and U.S. Pat. No. 5,711,773 and use of such equipment for reactive deposition of carbon and nitrogen is described by Andrei Stanishevsky, "Quaziamorphous Carbon and Carbon Nitride Films Deposited from the Plasma of Pulsed Cathodic Arc Discharge" in Chaos, Solitons and Fractals, Vol. 10, pp. 2045-2066 (1999). The "carbon nitride" process was modified to incorporate iron (Fe) into the deposited thin film/coating according to the procedure outlined below.

Iron was incorporated into 33 mm graphite cathodes (Grade SFG2, Poco Graphite, Decatur, Tex.) by inserting iron wires (1.2 mm diameter by 1 cm in length, Alpha-Aesar, Ward Hill, Mass.) into holes drilled into the graphite rods (cross-section) surface. The graphite/iron cathode was placed into the pulsed cathodic arc device where it served as feedstock for the deposited coatings. The pulsed cathodic arc equipment used is functionally equivalent to that described in U.S. Pat. No. 5,643,343 and U.S. Pat. No. 5,711,773 and Stanishevsky, A., Chaos, solitons and fractals; Vol. 10; Number 12; pp 2045-2066; (1999). The arc was operated with a main capacitance, auxiliary capacitance and ignition capacitance as well as the respective voltages as indicated in Table 1. The discharge frequency is also indicated in Table 1. The thickness was determined by a combination of the web speed and the pulse frequency. A Nanostructured Support Film (25.4 cm (10") wide by 30-60 cm (1-2') in length) was used as a catalyst support and was made according to the process described in U.S. Pat. Nos. 5,338,430, 4,812,352 and 5,039,561, using as substrates the microstructured catalyst transfer substrates (or MCTS) described in U.S. Pat. No. 6,136,412.

Deposition of the $C-N_x-Fe_y$ consisted of adding catalyst support material onto a web drive within the vacuum plasma arc deposition system, evacuating the to less than about $1 \times 10^{-8}$ atm ($1 \times 10^{-5}$ Torr), flowing nitrogen gas into the system to a pressure of about $3 \times 10^{-6}$ to $4 \times 10^{-6}$ atm (2-3 mTorr) and then activating the web and pulsed arc systems. The web drive and pulsed arc system were deactivated when the desired sample length had passed in front of the pulsed arc plasma deposition source. The deposition system was then filled with nitrogen gas to atmospheric pressure and the sample was removed. The samples were characterized by ESCA analysis and by their electrochemical performance. The results of these measurements are included in Table 2.

MEA Manufacture and Testing

Membrane electrode assemblies (MEA's) were made, assembled and tested as follows. Gas diffusion layers (GDL's) placed on either side of the catalyst coated membrane (CCM) were fabricated by coating a gas diffusion micro-layer on one side of a Ballard Carbon Paper that had been treated for hydrophobicity. A platinum dispersed catalyst ink was coated on the anode GDL to make a catalyst coated backing (CCB). The non platinum catalyst of the examples was incorporated into a one-sided catalyst coated membrane (CCM) as the cathode. The CCM was made by lamination transfer of the coated non-platinum catalyst material onto a cast Nafion™ proton exchange membrane (PEM). The PEM was prepared by notch-coating a dispersion of Nafion™ 1000 (DuPont Chemical Co., Wilmington, Del.) onto an inert backing at a loading such that the final, dried film was approximately 30 microns in thickness. An additional cast Nafion™ membrane was placed between the anode CCB and the cathode one-sided CCM. The MEA assembled from the components described above was formed in a 50-cm$^2$ test cell fixture having quad-serpentine flow fields, at approximately 25-30% compression. Gas stream flows of 500 SCCM with approximately 150% relative humidity were introduced to the anode and cathode sides of the cell. Electrochemical tests were performed at 75° C. as described under "AC Interfacial Impedance", "Cyclic Voltammetry to Measure Stability" and "Polarization Measurements of Catalytic Activity".

Interfacial AC Impedance

The AC (alternating current) impedance method was primarily applied in order to check the resistance of the new catalysts materials as well as the interfacial resistance between the new catalyst and the membrane. Commercially available equipment and software was used to conduct these measurements including a potentiostat (Solartron 1470) with a frequency response analyzer (Solartron SI 1250) and a Scribner Associates Z-plot software package. Measurements were taken under hydrogen in the frequency range of 1 Hz-10 kHz. The applied amplitude of the ac signal was kept at 10 mV. The values for the catalyst resistance were extrapolated from the high frequency region.

Cyclic Voltammetry to Measure Stability

Chemical stability of the catalyst/membrane interface was checked by performing cycling voltammetry measurements. In order to avoid unwanted reactions, the catalyst was kept under nitrogen. The cyclic voltammetry was performed by using a potentiostat (Solartron 1470) and Scribner Associates Corware software package. The voltammograms obtained in this way served also as base line for the activity of the catalyst. Cyclic voltammograms were done at 50, 20, 10 and 5 mV/s between 0.01V and 1.1V under nitrogen flow to the cathode and hydrogen flow to the anode to measure stability in voltage window for fuel cells and serve as a baseline for oxygen response.

Polarization Measurements of Catalytic Activity

The catalytic activity of the new materials was tested by recording the polarization curves under oxygen and by comparing with the current recorded at the same voltage under nitrogen. The same instrumentation and methodology was used for the measurements under oxygen as for the ones described above for nitrogen. In order to compare the catalytic activity vs. the base line, as well among different samples, the comparisons were made not only at the same voltage but also at the same scan rate as those done under "Cyclic Voltammetry to Measure Stability".

X-ray Photoelectron Spectroscopy (ESCA)

ESCA analysis was done using a Physical Electronics PHI 5000 Series ESCA System. A Mg Kα photon source was used for excitation. The ESCA analysis software was AugerScan version 3.0-Beta D from RBD Enterprises. Peak areas were determined after subtracting an integrated background ("Shirley") and multiplied by the appropriate PHI elemental sensitivity factors to obtain relative concentration amounts. The nitrogen peak (N1s) has two component peaks, one at 398.5 eV and one at approximately 400.5 eV. The former peak at 398.5 eV has been associated with oxygen reduction reaction (ORR) catalysis and therefore it is useful to determine the relative intensity of these two components. Standard curve/peak fitting procedures were used to deconvolute multi-component peaks into the separate components. To track the relative intensity of the 398.5 eV peak the ratio of the 398.5 eV peak area and the 400.5 eV peak area is calculated. This number is labeled N ratio. Table 2 indicates the elemental composition data and the electrochemical performance data. The samples were prepared for ESCA analysis by first removing surface contaminants by subjecting each to a 10 minute sputter cleaning step using 3500 eV xenon ions, the sputter ion beam had a current of 1.25 microamps.

Example 1a $CN_xFe_y$ catalyst material was fabricated in the pulsed cathodic arc equipment as described under "Carbon Pulsed Cathodic Arc Process" while adding nitrogen gas into the deposition reactor or system. Pulse frequency was 4.1 Hz and web speed was 61 cm (24 inches)/minute. Three passes were made. Coating thickness was controlled by web speed and pulse frequency. Table 1 summarizes the process parameters. After deposition, the substrate was removed from the system.

Example 1b $CN_xFe_y$ catalyst material was fabricated in the pulsed cathodic arc equipment as in example 1a except pulse frequency was 5 Hz, web speed was 91.44 cm (36 inches)/minute and one pass was made. Table 1 summarizes the process parameters. After deposition, the substrate was removed from the system.

Comparative Example 1

The procedure for this C—$Fe_y$ example was the same as for Example 1a, except that nitrogen gas was not used in the deposition and the pulsed arc process was operated at 4 Hz with a web speed of 30.5 cm (12 inches)/minute. Table 1 summarizes the process parameters.

Example 2

Two Step (Drum and Arc)

$CN_x$ precursor material was first fabricated in the pulsed cathodic arc equipment according to parameters in Table 1 using a 33 mm graphite cathode. The resulting $CN_x$ coated nanostructured catalyst support from the cathodic arc system was transferred to a dc magnetron sputter system for deposition of C and iron. An iron containing target of 316 stainless steel was used. Deposition conditions were 100 W with 15.4 cm (6 in) distance. The background pressure was $7 \times 10^{-3}$ atm ($5 \times 10^{-6}$ Torr) before deposition and the working pressure, controlled by a throttle valve, was $4 \times 10^{-6}$ atm ($3 \times 10^{-3}$ Torr). Conditions are listed in Table 2.

Example 3

Two Step with Heated Substrate (Drum and Arc)

The coating for this sample was made in the same system but with parameters as shown in Table 2. The coating was deposited while the base substrate material was being heated. The substrate was heated to 200° C. with a drum tube heater. Process conditions are listed in Table 2.

TABLE 1

| | Pulsed Cathodic Arc Parameters | | | | |
|---|---|---|---|---|---|
| | Comp. Ex. 1 | Ex. 1a 1-step | Ex. 1b 1-step | Ex. 2, C-Nx 2-step, no heat | Ex. 3, C-Nx 2-step, heat |
| # Fe wires in cathode | 24 | 24 | 24 | 0 | 0 |
| Cm; main capacitance | 2220 | 2220 | 1480 | 2220 | 2220 |
| Ca; aux. capacitance | 185 | 185 | 185 | 185 | 185 |
| Ci; ign capacitance | 10 | 10 | 10 | 10 | 10 |
| Vm; main voltage | 250 | 250 | 250 | 250 | 250 |
| Va; aux. voltage | 300 | 300 | 300 | 300 | 300 |
| Vi; ign voltage | 700 | 700 | 700 | 700 | 700 |

TABLE 1-continued

| | | Pulsed Cathodic Arc Parameters | | | |
|---|---|---|---|---|---|
| | Comp. Ex. 1 | Ex. 1a 1-step | Ex. 1b 1-step | Ex. 2, C-Nx 2-step, no heat | Ex. 3, C-Nx 2-step, heat |
| f; frequency | 4 | 4 | 4 | 5 | 4 |
| web speed (ipm) | 12 | 12 | 36 | 96/2 passes | 24/3 passes |
| $N_2$ pressure | 0 | 1.8 mTorr | 1 mTorr | 1.8 mTorr | 3 mTorr |
| Thickness (nm) | 35 | 35 | 6 | 12 | 40 |

TABLE 2

| | | Sputter Process Parameters | | | | | |
|---|---|---|---|---|---|---|---|
| Example | Substrate temperature ° C. | $Ar/N_2$ ratio | Rotation/ stationary | Ar flow SCCM | DC voltage | DC current Amps | Power Watts | Time minutes |
| EX 2 | 20 | 0 $N_2$ | Rot-22 Sec/rot | 6.1 | 427 | .234 | 100 | 5 |
| EX 3 | 200 | 10 | Stationary | 10 | 397 | .37 | 150 | 3 |

TABLE 3

| | ESCA and Cyclic Voltammetry Testing | | | | | | | |
|---|---|---|---|---|---|---|---|---|
| | At % C | At % N | At % Fe | At % O | I at 0.6 V mA/cm2 | I at 0.4 V mA/cm2 | I at 0.2 V mA/cm2 | Impedance at 10 kHz (ohm*cm$^2$) |
| EX 1a | 83.5 | 11.5 | 1.1 | 3.2 | | | | |
| CE 1 | 91.5 | 0.5 | 1.0 | 5.3 | | | | |
| EX 2** | 58.0 | 3.9 | 2.4 | 33.0 | 0.025 | 0.068 | 0.103 | 29.4 |
| EX 3 | | | | | 0.197 | 0.533 | 0.576 | 10.9 |

*Current at stated voltage (mA/cm2) as difference between $O_2$ and $N_2$ baseline
**sample not cleaned prior to ESCA partially accounting for high O.

Most of the samples exhibited good electrochemical stability, as demonstrated by the lack of a current response under inert gas (nitrogen) on the cathode side of the fuel cell.

Figure 1:
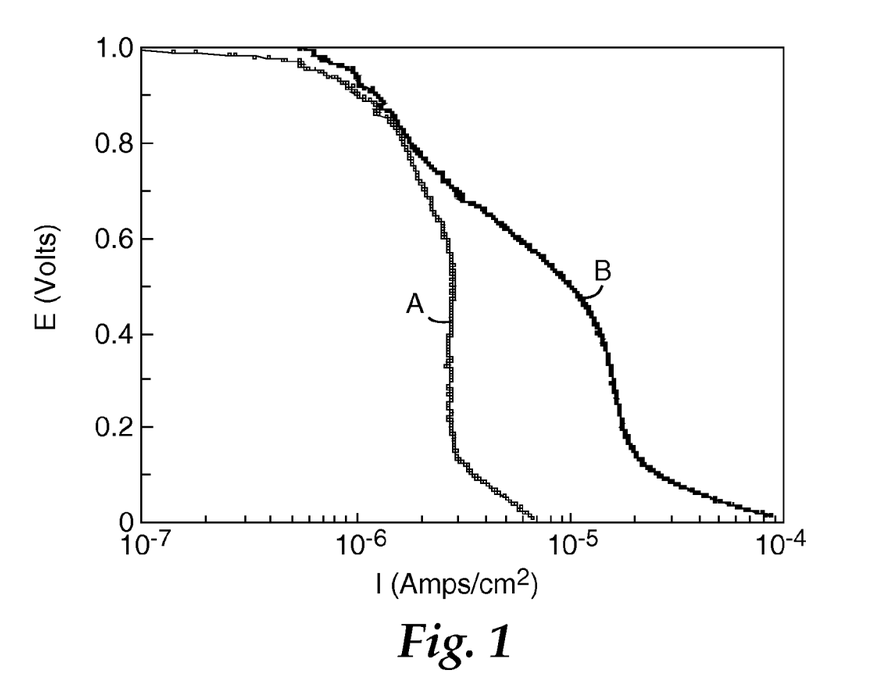
FIGS. 1-3 are cyclic voltammograms representing the behavior of catalysts according to the present disclosure, as noted in the Examples, except line 8701 in FIG. 3 which represents a comparative example.
Figure 2:
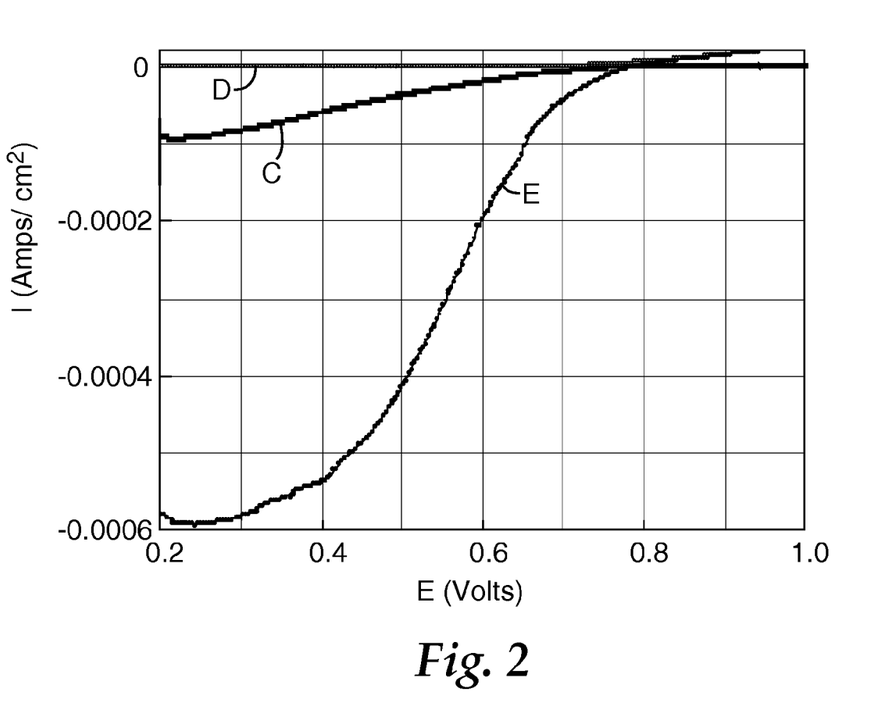
Figure 3:
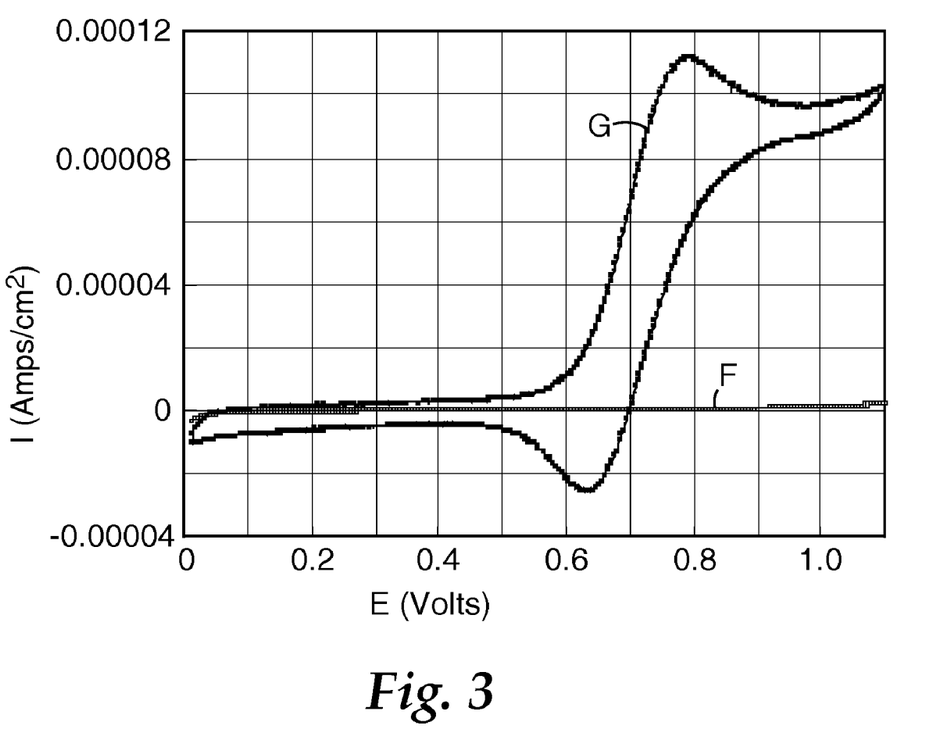

FIG. 1 demonstrates nitrogen baseline (gray) and oxygen response (black) the catalyst of Example 1b. The scans were made at 5 mV/s. FIG. 2 demonstrates nitrogen baselines and oxygen responses for example 2 (C) and nitrogen baseline and oxygen response for example 3 (D, E). The scans were made at 5 mV/s. FIG. 3 demonstrates the difference between example 1a (F) and comparative example 1 wherein the coating was deposited in the absence of nitrogen (G). The scans were made at 5 mV/s.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a supported catalyst comprising nanostructured elements which comprise microstructured support whiskers bearing nanoscopic catalyst particles, where the method comprises step 1) of providing microstructured support whiskers and step 2) of forming nanoscopic catalyst particles on the microstructured support whiskers, where step 2) comprises step a) of vacuum deposition of material from at least a first carbon target in the presence of nitrogen and step b) of vacuum deposition of material from a second target comprising at least one transition metal, the second target comprising no precious metals, wherein steps a) and b) are carried out simultaneously and wherein said at least one transition metal is iron or cobalt.

2. The method according to claim 1 wherein said at least one transition metal is iron.

3. A supported catalyst comprising nanostructured elements which comprise microstructured support whiskers bearing nanoscopic catalyst particles made according to the method of claim 1.

4. A fuel cell membrane electrode assembly comprising the supported catalyst according to claim 3.

5. A supported catalyst comprising nanostructured elements which comprise microstructured support whiskers bearing nanoscopic catalyst particles made according to the method of claim 2.

6. A fuel cell membrane electrode assembly comprising the supported catalyst according to claim 5.

* * * * *

UNITED STATES PATENT AND TRADEMARK OFFICE
CERTIFICATE OF CORRECTION

PATENT NO. : 7,867,648 B2  
APPLICATION NO. : 11/276166  
DATED : January 11, 2011  
INVENTOR(S) : Radoslav Atanasoski Page 1 of 1

It is certified that error appears in the above-identified patent and that said Letters Patent is hereby corrected as shown below:

Title Page  
Item [56], References Cited, OTHER PUBLICATIONS  
    delete "Allow" and insert --Alloy-- therefor.

Column 1  
Line 20-21, delete "*Fundamentals*"  
    and insert --*Fundamentals*,-- therefor.

Column 7  
Line 25, delete "9.2x10-3"  
    and insert --$9.2 \times 10^{-3}$-- therefor.

Column 9  
Line 7, delete "Corware"  
    and insert --Corrware,-- therefor.

Signed and Sealed this  
Fifteenth Day of March, 2011

David J. Kappos  
*Director of the United States Patent and Trademark Office*